United States Patent Office 3,555,082
Patented Jan. 12, 1971

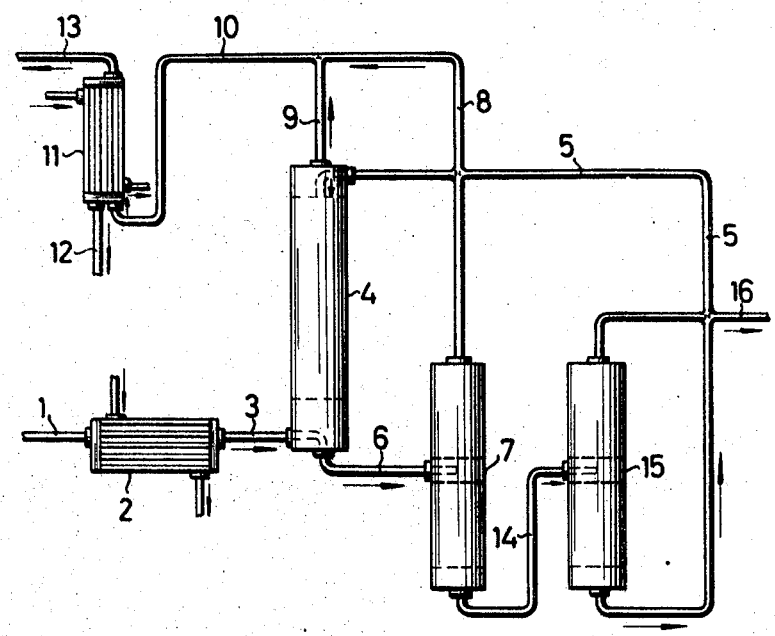

3,555,082
PROCESS FOR ISOLATING ACRYLIC ACID FROM THE REACTION GASES OBTAINED BY OXIDATION OF PROPYLENE OR ACROLEIN
Kurt Sennewald and Alfred Hauser, Knapsack, near Cologne, and Winfried Lork, Friesheim, near Euskirchen, Germany, assignors to Knapsack Aktiengesellschaft, Knapsack, near Cologne, Germany, a corporation of Germany
Filed Nov. 15, 1967, Ser. No. 683,246
Claims priority, application Germany, Dec. 15, 1966, K 60,928
Int. Cl. C07c 57/04
U.S. Cl. 260—526
10 Claims

ABSTRACT OF THE DISCLOSURE

Process for isolating acrylic acid from hot reaction gases obtained by oxidation of propylene or acrolein comprising the steps of cooling the reaction gas down to a temperature between about 90 and 200° C., extracting thereafter the gas in counter-current fashion with an ester of an aliphatic or aromatic monocarboxylic or dicarboxylic acid or with tributyl or tricresyl phosphate, subjecting resulting extract to distillation to remove acrylic acid in the form of a concentrated aqueous solution, and using remaining distillation residue for the extraction of further acrylic acid-containing reaction gas.

---

The catalytic oxidation of propylene or acrolein in the gas phase is known to be an important commercial process for the production of acrylic acid. In this process, propylene and/or acrolein are reacted with oxygen in the presence of oxidation catalysts (for example oxides of the elements molybdenum, chromium, vanadium, iron, cerium, titanium, nickel, tungsten, bismuth, tin, antimony, cobalt, phosphorus), at temperatures between 300 and 600° C., to give acrylic acid. The reaction, which is strongly exothermal, calls for the presence of inert gases as a diluent. These include, for example, the carbon oxides evolved by decomposition during the reaction or the nitrogen included in the air as the oxidizing agent. To increase the selectivity of this reaction, it is furthermore necessary to provide for the presence of steam, which is added to the starting gas in a proportion of 5 to 60% by volume. The reaction results in the formation of a gas mixture containing unreacted propylene and/or acrolein and in addition thereto acrylic acid in a proportion, which may range from a mere 0.2 up to a maximum of 3% by volume, and steam as well as small proportions of acetic acid and formaldehyde, depending on the reaction conditions. Unreacted propylene and/or acrolein are required to be isolated from the acrylic acid and to be returned to the reactor, if necessary or convenient.

The isolation of acrylic acid from the above gas mixture has been achieved heretofore by various processes. For example reference is made to British Patent 948,687 and its disclosure not only of acrylic acid production by propylene-oxidation, which does not form part of of the present invention, but also of acrylic acid-isolation from the reaction gases originating from the oxidation reaction, wherein the reaction gases, that have a temperature of 280 to 450° C. and are formed substantially of propylene, acrolein, acrylic acid, oxygen, inert gases and steam, are indirectly cooled down to a temperature of about 10° C. The resulting aqueous acrylic acid solution is freed from the acrolein contained therein by injection of hot steam and the acrolein, together with non-liquefied acrolein-containing residual gas, is returned, after addition of fresh propylene, oxygen and steam, to the reaction zone.

As taught in British Pat. 953,763, the hot acrylic acid-containing reaction gases are quenched by scrubbing them directly with an acrylic acid solution pre-cooled, for example to a temperature of 5 to 10° C., and thereafter cooling them indirectly in low temperature heat exchangers.

The above processes for the isolation of acrylic acid by low temperature-cooling are carried out under rather uneconomic conditions firstly because the hot, acrylic acid-containing reaction gas is required to be quenched down to a temperature of about 10° C., with dissipation of heat, and secondly because calorific energy is required to be supplied to the resulting aqueous condensate to expel unreacted acrolein.

A still further process for isolating acrylic acid from the reaction gases originating from the oxidation of propylene or acrolein has been described in U.S. patent application Ser. No. 654,876, which comprises pre-cooling the hot reaction gasses inside a heat exchanger down to a temperature of 100 to 200° C. and subjecting thereafter the said pre-cooled gases to direct scrubbing with water and thereby cooling them further down to a temperature between 30 and 90° C. The resulting aqueous, 10 to 35% acrylic acid solution is heated to a temperature of about 100 to 120° C. to expel residual acrolein therefrom, the acrylic acid enriching in the aqueous solution up to a maximum concentration of 40% by weight. This acrylic acid-concentration must not be exceeded, which is disadvantageous. A further disadvantage associated with this process resides in the fact that acetic acid and more particularly formaldehyde are removed in addition to acrylic acid from the reaction gas, on scrubbing the pre-cooled acrylic acid-containing reaction gas with water. The isolation of formaldehyde is known to entail considerable difficulties in the production of pure acrylic acid, and it can only be removed from dilute aqueous acrylic acid solutions by means of costly liquid-liquid extraction.

The disadvantages reported above can be obviated by the process of the present invention which enables the production of aqueous acrylic acid with a concentration say of 70% by weight, containing no more than traces of formaldehyde in addition to acetic acid.

The present process for isolating acrylic acid from hot reaction gases obtained by the oxidation of propylene or acrolein, which have a temperature of 300 to 600° C. and are formed of acrylic acid, unreacted propylene and/or acrolein as well as of acetic acid, formaldehyde, steam, oxygen and inert gases, comprises cooling the reaction gas down to a temperature between about 90 and 200° C., preferably between about 100 and 170° C., while obviating any condensation of gaseous constituents, extracting thereafter the gas in counter-current fashion, at a temperature between about 30 and 100° C., at atmospheric pressure or, if desired, under a slight overpressure of 0.5 to 5 atmospheres absolute, by means of an ester of an aliphatic or aromatic monocarboxylic or dicarboxylic acid, the alcoholic component of the ester containing 1 to 8 carbon atoms and the acid component of the ester containing 5 to 20 carbon atoms, or by means of tributyl or tricresyl phosphate, the ester being used in a proportion sufficient to product an extract with an acrylic acid content between about 5 and 35% by weight, preferably between 10 and 25% by weight, subjecting resulting extract to distillation to remove acrylic acid in the form of a concentrated aqueous solution having a strength, for example, of 70% by weight, and ultimately using remaining distillation residue for the extraction of further acrylic acid-containing reaction gas.

The methyl, ethyl, propyl, butyl and ethylhexyl esters of oleic acid, adipic acid or ortho-phthalic acid have proved very suitable for isolating acrylic acid from the reaction gas.

Complete isolation of the acrylic acid from the reaction gas is warranted by the use of the extractant in a proportion of about 50 to 2000 cc., preferably 100 to 1000 cc. per normal cubic meter (measured at N.T.P.) reaction gas.

In order to avoid acrylic acid polymerization during the work-up of the reaction gas, the extractant should be conveniently used in admixture with a conventional acrylic acid stabilizer, such as methylene blue, phenothiazine, pyrogallol, p-tertiary-butyl-pyrocatechol, copper acetate, acrylate or oleate.

A preferred mode of executing the present process comprises freeing the acrylic acid-containing extract, prior to distilling it, from acrolein at elevated temperature, preferably at about 100 to 140° C., and combining the resulting acrolein vapors with reaction gas constituents not absorbed by the extractant, the said constituents being chiefly formed of steam, unreacted propylene and/or acrolein, formaldehyde, carbon monoxide, carbon dioxide and nitrogen. The resulting gas mixture is cooled down to a temperature of about 20 to 70° C. to partially condense water of reaction in excess and formaldehyde, and remaining residual gas in admixture with fresh propylene and/or acrolein is returned anew to the oxidation step.

As compared with the art, the process of the present invention offers various advantages, namely the possibility of producing aqueous acrylic acid solutions with a strength higher than 50% by weight without any need of concentrating the acrylic acid present in dilute form in the reaction gas. Furthermore, the isolated acrylic acid is found to contain no more than traces of formaldehyde, as more than 85% of the formaldehyde quantity initially present is dissipated together with the gases issuing during the extraction step. When these issuing gases are returned to the propylene or acrolein oxidation, it is ultimately possible to omit any separate addition of steam as the issuing gases contain sufficient steam for carrying out the oxidation reaction.

An exemplary mode of executing the process of the present invention will be now described with reference to the accompanying drawing:

Hot reaction gas, which leaves the oxidation reactor with a temperature of about 400 to 500° C. and which apart from acrylic acid contains steam, carbon oxides, oxygen, nitrogen, unreacted propylene and/or acrolein, formaldehyde and acetic acid as its principal constituents, is caused to flow through line 1 to heat exchanger 2, in which it is indirectly cooled down to a temperature between 90 and 200° C., preferably between 100 and 170° C., so as to obviate any condensation of the reaction products. The cooled reaction gas then travels through line 3 to extracting column 4, for example a packed column or tray column, in which the acrylic acid is extracted in counter-current fashion from the reaction gas. The extractant is supplied through line 5 and introduced near the head of column 4. The quantity of extractant needed depends on the quantity of acrylic acid contained in the gas and on the acrylic acid-concentration desired for the extract leaving the bottom portion of column 4. The extract, which has a temperature of about 80° C., is conveyed from the said bottom portion through line 6 to stripping column 7, in which unreacted acrolein, if any, is vaporized and removed through line 8. Acrolein in vapor form issuing through line 8 is combined with gaseous reaction gas-constituents not absorbed by the extractant and issuing from column 4 through line 9, and the combined mixture is conveyed through line 10 to heat exchanger 11, in which steam in excess and formaldehyde are partially condensed at a temperature between 20 and 70° C. The resulting condensed matter is removed through line 12, while constituents not condensed in heat exchanger 11 are caused to leave that heat exchanger through line 13. Product accumulating in the bottom portion of stripping column 7, which product is a solution of all of the acrylic acid, water, acetic acid and traces of formaldehyde in the extractant, is introduced through line 14 into distilling column 15 and distilled therein. The distillate obtained in line 16 is a concentrated aqueous acrylic acid solution, which still contains some acetic acid and traces of formaldehyde. The extractant is recovered in the bottom portion of column 15 and can be returned anew through line 5 to extracting column 4.

In the event that the propylene and/or acrolein, which are oxidized to yield acrylic acid, are found to have been completely transformed by the oxidation, it is possible to omit recycling of the gases issuing from column 4 and to omit column 7 as well as heat exchanger 11.

EXAMPLE 1

1020 liters/hr. reaction gas, which contained unreacted propylene and 1.5% by volume acrylic acid, 0.2% by volume acetic acid, 0.4% by volume formaldehyde, 21.9% by volume steam as well as oxygen and inert gases, and which had been coled down to 116° C. inside heat exchanger 2, where introduced into tray column 4 having a diameter of 80 mm. and 24 trays. 200 grams/hr. diethyl phthalate in admixture with 0.04% by weight methylene blue were supplied to the head of column 4. The gas temperature of 63 to 64° C. found to prevail in the column, enabled 984 liters of a gas mixture to be removed near the column head, the gas mixture containing more than 98% of the formaldehyde initially contained in the reaction gas, and 20.8% by volume water. From the bottom portion of column 4 there were removed, per hour, 269 grams of a diethyl phthalate solution which contained 18.2% acrylic acid, 1.8% acetic acid and 5.6% water. When distilled in vacuo under a pressure of 40 mm. mercury, this solution enabled 94.5% of the acrylic acid contained in the starting gas to be obtained in the form of a 70% aqueous solution that still contained 7.5% by weight acetic acid. The formaldehyde content of the solution was found to be less than about 0.1% by weight.

EXAMPLE 2

A tray column 4 with a diameter of 80 mm. and 24 trays was supplied, per hour, with 1033 liters reaction gas cooled down to about 120° C. and containing inert gases as well as 1.64% by volume acrylic acid, 0.2% by volume formaldehyde, 0.1% by volume acetic acid, 4.5% by volume acrolein and 21.4% by volume water. 222.5 grams/hr. diethyl phthalate in admixture with 0.1% by weight methylene blue as a stabilizer were introduced near the column head so as to cool the reaction gas inside the column down to 62 to 65° C. From the bottom portion of the tray column there were removed 295 grams of a hot phthalic ester solution containing 17.8% by weight acrylic acid and 1.3% by weight acetic acid; this corresponded to an acrylic acid yield of 96.7%, referred to the quantity of that acid initially present in the reaction gas. To remove dissolved acrolein, the phathalic ester solution was introduced first into packed column 7 (dimensions: 30 x 800 mm.), heated therein to 110° C. and distilled then in vacuo under a pressure of about 40 mm. mercury. As the distillate there was obtained acrylic acid in the form of a 72% by weight aqueous solution which contained 5% by weight acetic acid and less than 1% by weight formaldehyde. The diethyl phthalate obtained in the bottom portion of the packed column was recycled to extracting column 4. Gas free from acrylic acid and acetic acid issuing at the head of the extracting column, was conveyed to heat exchanger 11 charged with hot water, and cooled therein down to about 56 to 60° C. 42 grams/hr. of an about 6% aqueous formaldehyde solution could be separated. 942 liters of issuing gas free from formaldehyde left heat exchanger 11, the gas containing 4.8% by volume acrolein and 16.1% by volume steam. The quantity of a acrolein contained in the issuing gas corresponded to 98% of the acrolein quantity initially contained in the starting gas. The issuing gas in admixture with fresh propylene was recycled to the oxidation reactor.

What is claimed is:

1. A process for isolating acrylic acid from hot reaction gases obtained by oxidation of propylene or acrolein, which have a temperature of 300 to 600° C. and are formed of acrylic acid, unreacted propylene or acrolein as well as of acetic acid, formaldehyde, steam, oxygen and inert gases, which comprises cooling the reaction gas down to a temperature between 90 and 200° C., while obviating any condensation of gaseous constituents, extracting thereafter the gas in counter-current fashion, at a temperature between about 30 and 100° C. and under a pressure of 0.5 to 5 atmospheres absolute, by means of at least one member selected from the group consisting of tributyl phosphate, tricresyl phosphate and a carboxylic acid ester, the carboxylic acid ester being an ester selected from the group consisting of the methyl ester, ethyl ester, propyl ester, butyl ester and ethyl hexyl ester of an acid selected from the group consisting of oleic acid, adipic acid and ortho-phthalic acid, the esters being used in a proportion sufficient to produce an extract with an acrylic acid content between about 5 and 35% by weight, subjecting resulting extract to distillation to remove acrylic acid in the form of a concentrated aqueous solution, and ultimately using remaining distillation residue for the extraction of further acrylic acid-containing reaction gas.

2. The process of claim 1, wherein the reaction gas is cooled down to a temperature of about 100 to 170° C.

3. The process of claim 1 wherein the ester is used in a proportion sufficient to produce an extract having an acrylic acid content of about 10–25% by weight.

4. The process of claim 1 wherein the extractant is used in a proportion between about 50–2000 cc. per normal cubic meter (measured at N.T.P.) reaction gas.

5. The process of claim 4 wherein the extractant is used in a proportion of about 100–1000 cc. per normal cubic meter reaction gas.

6. The process of claim 1 wherein the extraction step is carried out at atmospheric pressure.

7. The process of claim 1 wherein the extractant is used in admixture with a compound selected from the group consisting of methylene blue, phenothiazine, pyrogallol, p-tertiary-butyl-pyrocatechol, copper acetate, copper acrylate and copper oleate as stabilizer for the acrylic acid.

8. The process of claim 1 wherein the acrylic acid-containing extract is free from acrolein at elevated temperature prior to distillation.

9. The process of claim 8, wherein the acrylic acid-containing extract is freed from acrolein at a temperature between about 100 and 10° C.

10. The process of claim 8, wherein the acrolein in vapor form is combined with reaction gas-constituents not absorbed by the extractant, the said constituents being comprised substantially of steam, unreacted propylene or acrolein, formaldehyde, carbon monoxide, carbon dioxide and nitrogen, and the resulting combined gas mixture is partially condensed by cooling it down to a temperature of about 20 to 70° C. and thereby freed from water of reaction in excess and formaldehyde, and remaining residual gas in admixture with fresh propylene or acrolein is returned anew to the oxidation.

References Cited
UNITED STATES PATENTS 3,470,238  9/1969  Asano et al. _____ 260—526
3,478,093  11/1969  Nonnenmacher et al. __ 260—526

JAMES A. PATTEN, Primary Examiner

PO-1050
(5/69)

UNITED STATES PATENT OFFICE
CERTIFICATE OF CORRECTION

Patent No. 3,555,082  Dated January 12, 1971

Inventor(s) Kurt Sennewald et al

It is certified that error appears in the above-identified patent and that said Letters Patent are hereby corrected as shown below:

Column 6, line 19, in claim 9, "10°C" should read -- 140°C --

Signed and sealed this 29th day of February 1972.

(SEAL)
Attest:

EDWARD M. FLETCHER, JR.
Attesting Officer

ROBERT GOTTSCHALK
Commissioner of Patents